United States Patent
Li et al.

(10) Patent No.: US 8,014,282 B2
(45) Date of Patent: Sep. 6, 2011

(54) HASHING PACKET CONTENTS TO DETERMINE A PROCESSOR

(75) Inventors: Yadong Li, Portland, OR (US); Xinan Tang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 320 days.

(21) Appl. No.: 12/215,288

(22) Filed: Jun. 26, 2008

(65) Prior Publication Data

US 2009/0323692 A1     Dec. 31, 2009

(51) Int. Cl.
*G01R 31/08* (2006.01)

(52) U.S. Cl. .................... 370/230.1; 370/395.32

(58) Field of Classification Search .......... 370/395.32, 370/389, 392, 395.3, 400, 401, 412, 463, 370/229, 230, 230.1, 235, 252; 709/224, 709/230, 238, 245, 250

See application file for complete search history.

(56) References Cited

U.S. PATENT DOCUMENTS

| | | | |
|---|---|---|---|
| 6,389,468 B1 | 5/2002 | Muller et al. | |
| 6,453,360 B1 | 9/2002 | Muller et al. | |
| 6,483,804 B1 | 11/2002 | Muller et al. | |
| 6,484,209 B1 | 11/2002 | Momirov | |
| 6,650,640 B1 | 11/2003 | Muller et al. | |
| 6,683,873 B1 | 1/2004 | Kwok et al. | |
| 6,973,040 B1 | 12/2005 | Ricciulli | |
| 7,043,494 B1 | 5/2006 | Joshi et al. | |
| 7,162,740 B2 | 1/2007 | Eastlake, III | |
| 7,219,228 B2 | 5/2007 | Lin | |
| 7,529,242 B1 * | 5/2009 | Lyle | 370/392 |
| 7,620,046 B2 | 11/2009 | Ronciak et al. | |
| 7,669,234 B2 * | 2/2010 | Buer | 726/11 |
| 2002/0144004 A1 | 10/2002 | Gaur et al. | |
| 2003/0043810 A1 | 3/2003 | Boduch et al. | |
| 2003/0043825 A1 * | 3/2003 | Magnussen et al. | 370/401 |
| 2003/0226032 A1 | 12/2003 | Robert | |
| 2004/0030757 A1 | 2/2004 | Pandya | |
| 2005/0091412 A1 | 4/2005 | Pinkerton et al. | |
| 2005/0182841 A1 * | 8/2005 | Sharp | 709/228 |
| 2006/0034310 A1 * | 2/2006 | Connor | 370/419 |
| 2006/0083227 A1 * | 4/2006 | Eldar | 370/389 |
| 2006/0085554 A1 * | 4/2006 | Shah et al. | 709/235 |
| 2006/0285494 A1 | 12/2006 | Li et al. | |
| 2007/0127581 A1 | 6/2007 | Connor et al. | |

(Continued)

FOREIGN PATENT DOCUMENTS

EP     1367799 A2     12/2003

OTHER PUBLICATIONS

"Scalable Networking: Eliminating the Receive Processing Bottleneck—Introducing RSS", WinHEC 2004 Version—Apr. 14, 2004, 17 Pages.

(Continued)

*Primary Examiner* — Jung Park

(57) ABSTRACT

The disclosure includes a description of an apparatus having circuitry to determine a first hash value for a first packet tuple of a first packet traveling in a first direction of a duplex connection and determine a processor for the first packet from a set of multiple processors based, at least in part, on the first hash value. The apparatus includes circuitry to determine a second hash value for a second packet tuple of a second packet traveling in a second direction of the duplex connection and determine the same processor for the second packet from the set of multiple processors based, at least in part, on the second hash value.

14 Claims, 3 Drawing Sheets

U.S. PATENT DOCUMENTS

| | | | |
|---|---|---|---|
| 2007/0234310 | A1 | 10/2007 | Zhang et al. |
| 2008/0077792 | A1* | 3/2008 | Mann .......................... 713/160 |
| 2009/0007150 | A1 | 1/2009 | Li et al. |
| 2010/0091774 | A1 | 4/2010 | Ronciak et al. |

OTHER PUBLICATIONS

Office Action received for U.S. Appl. No. 10/957,001, mailed on Oct. 5, 2007, 14 pages.

Office Action received for U.S. Appl. No. 10/957,001, mailed on Apr. 16, 2008, 10 pages.

Office Action received for U.S. Appl. No. 10/957,001, mailed on Dec. 16, 2008, 10 pages.

Office Action received for U.S. Appl. No. 12/587,045, mailed on Dec. 8, 2010, 12 pages.

Office Action received for U.S. Appl. No. 11/513,516, mailed on Nov. 10, 2010, 4 pages.

International Search Report and Written Opinion received for PCT Patent Application No. PCT/US2005/044771, mailed on May 8, 2006, 21 pages.

Sapuntzakis et al., "The Case for RDMA," Cisco Systems, Dec. 2000, 13 pages.

"Addressing TCP/IP Processing Challenges Using the IA and IXP Processors," Communications Processing, Intel Technology Journal, vol. 7, Issue 4, Nov. 14, 2003, pp. 39-50.

"FreeBSD/Linux Kernel Cross Reference sys/sys/queue.h," 1991, 1993, The Regents of the University of California, 10 pages.

"FreeBSD/Linux Kernel Cross Reference sys/netinet/tcp.sub.—syncache.c," 2001 Networks Associates Technology, Inc., 25 pages.

DAEMON9 "Project Neptune," Phrack Magazine, vol. 7, Issue 48, file 13 of 18, Jul. 1996, 23 pages.

"Intel IXP2400 Network Processor hardware Reference Manual," Nov. 2003, 408 pages.

Reutsche "The Architecture of a Gb/s Multimedia Protocol Adapter," Computer Communication Review ACM SIGCOMM, vol. 23, No. 3, Jul. 1993, pp. 59-68.

Steenbergen, "Understanding Modern Denial of Service," Oct. 28, 2001, 10 pages.

International Preliminary Report on Patentability received for PCT Patent Application No. PCT/US2005/044771, mailed on Jun. 28, 2007, 8 pages.

Lemon "Resisting SYN Flood DoS Attacks with a SYN Cache," USENIX Association, Berkley, CA, 2002, pp. 89-97.

"Technology at Harvard Law, RSS 2.0 Specification," Jul. 15, 2003, p. 10, available at: <http://cyber.law.harvard.edu/rss/rss.html>.

Girouard "patch for common networking error messages," Jun. 16, 2003, available at: <http://oss.sgi.com/archives/netdev/2003-06/msg00474.html>.

"Re: [review please] tcp syn cache cleanup code for sc->sc_so," Aug. 21, 1999, 1 page, available at: <http://mail-index.netbsd.org/tech-net/1999/08/21/0001.html>.

Merry "Zero Copy Sockets and NFS Code for FreeBSD," Jun. 16, 2000, 7 pages, available at: <http://www.mail-archive.com/freebsd-current@freebsd.org/msg17038.html>.

* cited by examiner

HASHING PACKET CONTENTS TO DETERMINE A PROCESSOR

BACKGROUND

Networks enable computers and other devices to communicate. For example, networks can carry data representing video, audio, e-mail, and so forth. Typically, data sent across a network is divided into smaller messages known as packets. By analogy, a packet is much like an envelope you drop in a mailbox. A packet typically includes "payload" and a "header". The packet's "payload" is analogous to the letter inside the envelope. The packet's "header" is much like the information written on the envelope itself. The header can include information to help network devices handle the packet appropriately. For example, the header can include an address that identifies the packet's destination.

A series of related packets can form a connection. A connection is often identified by a combination of different portions of a packet known as a tuple. For example, a tuple is commonly formed by a combination of source and destination information of a packet header.

A variety of networking protocols maintain state information for a connection. For example, the Transmission Control Protocol (TCP) stores state data for a connection in a Transmission Control Block (TCB). A TCB includes state data such as the last received byte, the last successfully transmitted byte, and so forth. Typically, connection state data is accessed and, potentially, updated for each packet in a connection. In a multi-processor system, this can create contention issues between processors handling packets for the same connection. That is, for example, different processors handling data for the same connection may each attempt to access a connection's state data at the same time, creating requirements for data locking and introducing delay as the processors wait for access to the connection state data.

DETAILED DESCRIPTION

In a multi-processor system, processors may vie for access to the same connection state information. Contention between the processors, however, can be reduced by mapping respective connections to the respective processors. For example, a network interface controller (NIC) may perform a hash on a tuple of a received packet and use the hash to determine a processor to handle a given packet. Directing packets having the same tuple to the same processor can help pin down state information to the same processor. This can enable the processor to retain the state data for a connection in local processor memory (e.g., cache memory) and reduce contention between processors trying to access the same connection state data.

Figure 1:
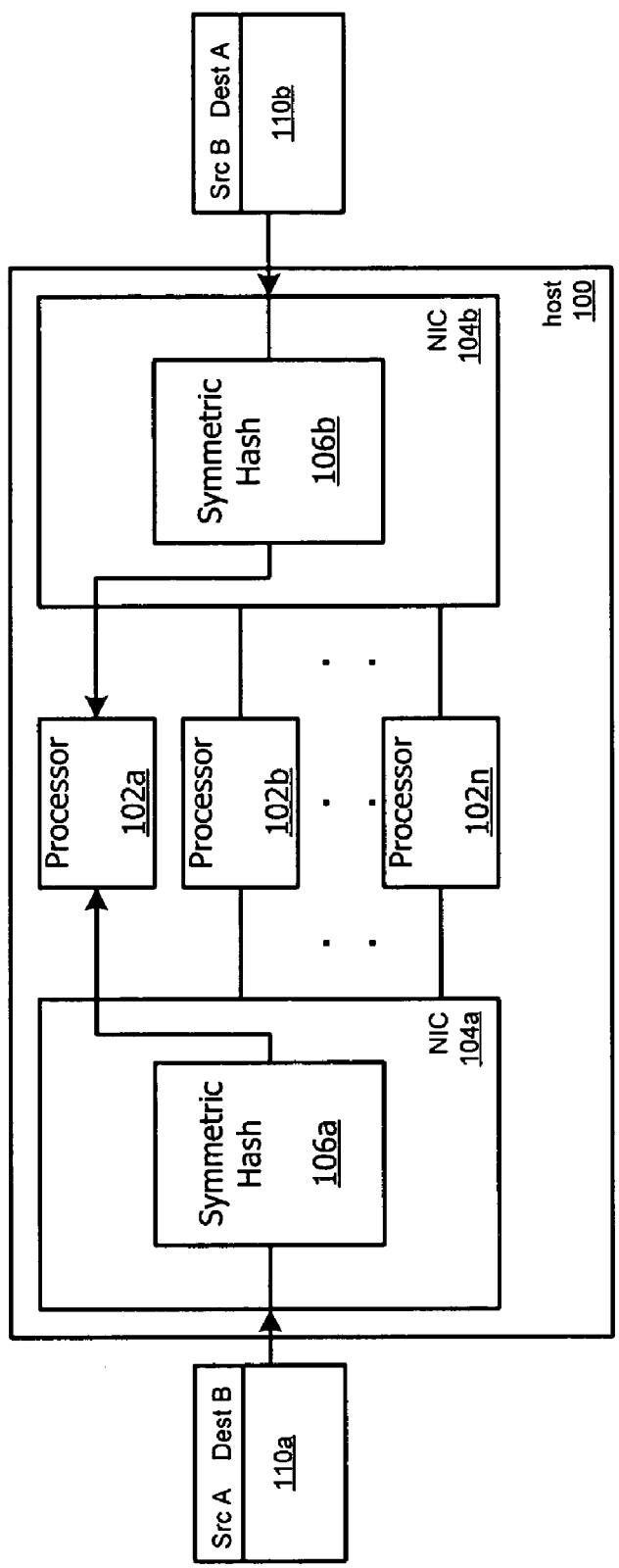
FIG. 1 is a diagram of a system that determines a processor for a packet using a symmetric hash.

Intermediate nodes in a network such as a security gateway, firewall, switch, or router may handle data traveling in both directions of a duplex (i.e., bi-directional) connection. For example, FIG. 1 depicts a multi-processor (e.g., multi-core) 102a-102n host 100 handling packets of a duplex connection between nodes "A" and "B". The processors 102a-102n may be integrated on a single die and/or may be included within the same integrated circuit package. The processors 102a-102n each may feature programmable logic such as an instruction decoder, arithmetic logic unit, and so forth. As shown, the processors 102a-102n may be coupled to and commonly service packets received by NICs 104a, 104b. Processors 102a-102n may communicate with the NICs 104a, 104b via a chipset, interconnect, or other inter-communication circuitry.

In the example shown in FIG. 1, packets (e.g., 110a) traveling from node A to node B have a source of "A" and a destination of "B" while packets (e.g., 110b) traveling from node B to node A have a source of "B" and a destination of "A". As shown, the host 100 receives packet 110a at NIC 104a and packet 110b at NIC 104b. Both NICs 104a, 104b map received packets to a selected processor 102a-102n.

A NIC 104a, 104b may use an asymmetric hash that yields a different hash value for a packet in a connection depending on the direction the packet travels (e.g., a hash where hash (Source A, Destination B) does not equal hash (Source B, Destination A)). In this case, the NICs 104a, 104b may map packets belonging to the same connection to different processors 102a-102n due to the different hash values derived for packets traveling different directions in the same connection. This may undermine a goal of reducing contention between processors 102a-102n for connection state data. That is, if packet 110a is mapped to processor 102a and packet 110b is mapped to processor 102n, then processors 102a and 102n may both vie for access to the connection state data for the connection between nodes A and B.

As shown in FIG. 1, NICs 104a, 104b may instead use a processor selection operation that features a symmetric hash that yields the same hash value for a packet in a connection regardless of the direction the packet travels (e.g., a hash where hash (Source A, Destination B)=hash (Source B, Destination A)). Such a hash may map packets belonging to the same duplex connection to the same processor, processor 102a in this example. In other words, due to generation of the same hash value for packets traveling in both directions of a connection despite packet data variations (e.g., different source and destination information), packets belonging to the same connection can be mapped to the same processor 102a. This can reduce cache thrash and contention between processors 102a-102n for connection state data.

Figure 2:
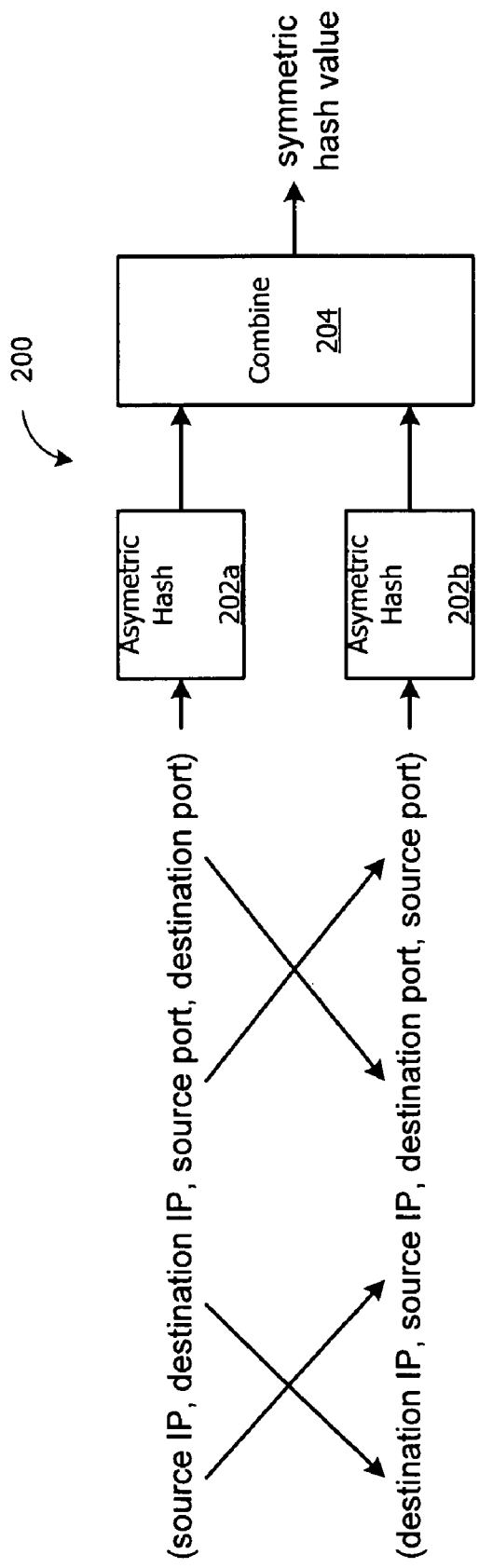
FIG. 2 is a diagram illustrating a symmetric hash.

FIG. 2 depicts a sample technique to generate a symmetric hash. As shown, circuitry 200 operates on different orders of the same bits of packet data. For example, in the illustration, asymmetric hash circuitry 202a and 202b operates on switched orders of source/destination data for a TCP/IP tuple. That is, hash 202a operates on a tuple formed by:

{source IP, destination IP, source TCP port, destination TCP port} while hash 202b operates on a tuple formed by:

{destination IP, source IP, destination TCP port, source TCP port}.

The output of circuitry 202a and 202b is then combined. For example, the output of hash circuitry 202a and 202b may undergo a combination operation 204 such as a logical AND and/or XOR. Thus, in this sample implementation, the circuitry 200 can form a symmetric hash from asymmetric hash engines/functions 202a, 202b. This can enable the circuitry 200 to use commonly implemented asymmetric hash engines (e.g., Toeplitz hash engines) to generate a symmetric hash, lowering the design cost of the circuitry 200.

While FIG. 2 depicts a parallel implementation of the circuitry, other implementations may vary. For example, in a serial implementation, the different sets of bits may be fed to the same hash circuitry in turn. A wide variety of other techniques may be used to generate a symmetric hash. For example, protocol data may be sorted before a hash operation. For instance, a symmetric hash can be produced by circuitry that orders IP address within a tuple by magnitude and TCP ports within a tuple by magnitude and feeds the single ordered set of tuple data to a single hashing circuit. Thus, in FIG. 1, both packets 110a and 110b would yield the same ordered set of data to be hashed, produce the same hash value, and may be mapped to the same processor 102a.

Once determined, a symmetric hash value may then be used to determine a processor mapped to a packet's connection. For example, a mask may be applied to the symmetric hash value and may be used as a lookup value into an indirection table that associates the masked hash values to processor numbers. The resulting processor number from the indirection table may be adjusted, for example, by incrementing by a base core/processor number. After a processor is determined for a packet, the packet may be queued, for example, in a processor specific queue. An interrupt may then be generated to the processor. Potentially, interrupt moderation may be used to reduce the number of interrupts signaled.

While FIG. 2 depicted a tuple of the source and destination IP addresses and source and destination TCP ports, other tuples may be formed. For example, a tuple may consist solely of the IP source and destination addresses. Alternately, or in addition, a tuple may include information from other header fields, headers in lower layers (e.g., Ethernet) or higher layers in a protocol stack (e.g., HTTP (Hypertext Transfer Protocol) data or extensible Markup Language (XML) data), a packet's payload, and/or portions thereof. Further, while the above generically referred to Internet Protocol datagrams, this term encompasses both IPv4 (Internet Protocol version 4) and IPv6 (Internet Protocol version 6) datagrams. Similarly, while the above described IP datagrams encapsulating TCP segments, other layer 3 or layer 4 protocols (e.g., User Datagram Protocol [UDP]) in OSI (Open Systems Interconnection) terminology may similarly use the techniques described above. Finally, a symmetric hash may also operate on data not found in a packet (e.g., identification of the NIC receiving a packet).

Figure 3:
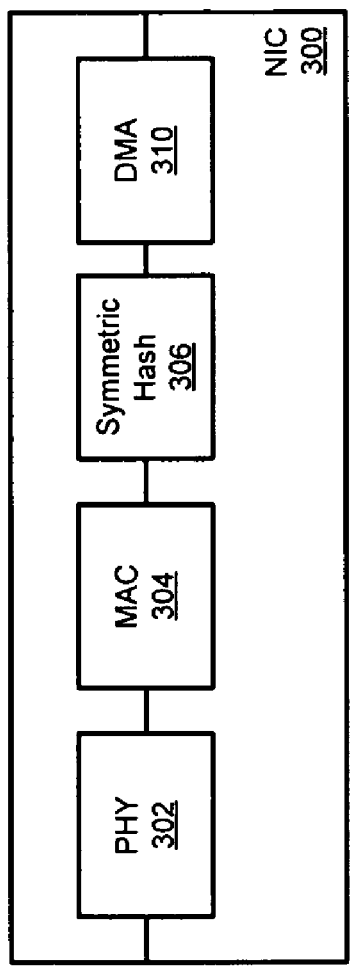
FIG. 3 is a diagram illustrating a network interface controller.

FIG. 3 depicts a sample NIC 300 implementing a symmetric hash. As shown, the NIC 300 includes a PHY 302 (physical layer devices) (e.g., wired or wireless PHYs) and a MAC (media access control). The NIC 300 may also feature a DMA (Direct Memory Access) engine to transfer packet data to host memory (not shown) or directly to a host processor for example via a chipset, interconnect, or other communication medium. In the sample shown, the NIC 300 includes symmetric hash circuitry 304 for use in determining a processor 102a-102n to handle a packet.

A NIC, such as NIC 300, can be configured to operate in either symmetric or asymmetric hash mode. For example, a NIC may be configured to use a particular hash function (e.g., Toeplitz) and/or whether to generate a symmetric or asymmetric hash. For instance, this configuration may be performed via a network driver executed by a processor. For example, the network driver may specify an object identifier with the desired configuration values/selection of asymmetric or symmetric hash.

While FIGS. 1-3 depict sample implementations and sample environments, many other implementations are possible. For example, the system of FIG. 1 may feature a single NIC or more than two NICs that determine a symmetric hash. Further, the symmetric hash circuitry need not be located in a NIC, but may instead may be located elsewhere in the host, such as in a chipset, processor 102a-102n circuitry, or instructions executed by a processor 102a-102n. Additionally, while the above described an intermediate node in a network, the techniques described above may also be used in a terminal network node (e.g., a server). Further, while described in conjunction with bi-direcitonal connections, the techniques described above may also work with multi-casting or n-directional connections.

The term packet as used herein encompasses protocol data units (PDUs) for a wide variety of network protocols featuring a header and payload. A packet may be an encapsulated or encapsulating packet. Further, a given tuple may feature data from zero or more encapsulated packet headers and may or may not feature data from an encapsulating packet header. The techniques described above may be implemented in a variety of software and/or hardware architectures. The term circuitry as used herein includes hardwired circuitry, digital circuitry, analog circuitry, programmable circuitry, and so forth. The programmable circuitry may operate on computer programs.

Other embodiments are within the scope of the following claims.

What is claimed is:

1. A method, comprising:
   receiving an Internet Protocol datagram;
   performing a first hash operation on a first ordering of a set of bits included in the Internet Protocol datagram, the set of bits including bits included in a header of the Internet Protocol datagram;
   performing a second hash operation on a second ordering of the set of bits included in the Internet Protocol datagram, the first ordering of the set of bits being different than the second ordering of the set of bits;
   combining results of the first hash operation and the second hash operation;
   determining a processor for the Internet Protocol datagram from among a set of multiple processors based on the combining of the results of the first hash operation and the second hash operation;
   receiving at least one configuration parameter, the at least one configuration parameter to select an operation mode of an network interface controller, the operation modes of the network interface controller including:
   a first mode that uses an asymmetric hash operation on flow data of a packet to determine a processor from a set of multiple processors for the packet; and
   a second mode that uses a symmetric hash operation of flow data of a packet to determine a processor from the set of multiple processors for the packet.

2. The method of claim 1,
   wherein the Internet Protocol datagram comprises an encapsulated Transmission Control Protocol segment; and
   wherein the set of bits included in the Internet Protocol datagram comprise bits included in a header of the encapsulated Transmission Control Protocol segment.

3. The method of claim 1, wherein the combining comprises at east one of the following:
   ANDing results of the first hash operation and the second hash operation; and
   XORing results of the first hash operation and the second hash operation.

4. The method of claim 1, wherein the first hash operation comprises a first Toeplitz hash operation and the second hash operation comprises a second Toeplitz hash operation.

5. A computer program product, disposed on a non-transitory tangible computer readable medium, the product comprising instructions for causing a processor to:

issue to a network interface controller a set of configuration parameters, at least one of the configuration parameters to select an operation mode of the network interface controller, the operation modes of the network interface controller including:
a first mode that uses a asymmetric hash operation of flow data of a packet to determine a processor from a set of multiple processors for the packet; and
a second mode that uses a symmetric hash operation of flow data of a packet to determine a processor from the set of multiple processors for the packet.

6. The computer program product of claim 5,
wherein the second mode comprises:
   a first hash operation of flow data of a packet having a first bit ordering;
   a second hash operation of the flow data of the packet having a second bit ordering, wherein the first bit ordering is different than the first bit ordering; and
   a combining of the first hash operation and the second hash operation.

7. The computer program product of claim 5,
wherein the combining comprises at least one of the following:
ANDing results of the first hash operation and the second hash operation; and
XORing results of the first hash operation and the second hash operation.

8. A network interface controller, comprising circuitry to:
receive an Internet Protocol datagram;
perform a first hash operation on a first ordering of a set of bits included in the Internet Protocol datagram, the set of bits including bits included in a header of the Internet Protocol datagram;
perform a second hash operation on a second ordering of the set of bits included in the Internet Protocol datagram, the first ordering of the set of bits being different than the second ordering of the set of bits;
combine results of the first hash operation and the second hash operation;
determine a processor for the Internet Protocol datagram from among a set of multiple processors based on the combining of the results of the first hash operation and the second hash operation;
receive at least one configuration parameter, the at least one configuration parameter to select an operation mode of an network interface controller, the operation modes of the network interface controller including:
   a first mode that uses an asymmetric hash operation on flow data of a packet to determine a processor from a set of multiple processors for the packet; and
   a second mode that uses a s symmetric hash operation of flow data of a packet to determine a processor from the set of multiple processors for the packet.

9. The network interface controller of claim 8,
wherein the Internet Protocol datagram comprises an encapsulated Transmission Control Protocol segment; and
wherein the set of bits included in the Internet Protocol datagram comprise bits included in a header of the encapsulated Transmission Control Protocol segment.

10. The network interface controller of claim 8, wherein the combining comprises at least one of the following:
ANDing results of the first hash operation and the second hash operation; and
XORing results of the first hash operation and the second hash operation.

11. An apparatus, comprising circuitry to:
determine a first hash value for a first packet tuple of a first packet traveling in a first direction of a bi-directional connection;
determine a processor for the first packet from a set of multiple processors based, at least in part, on the first hash value;
determine a second hash value for a second packet tuple of a second packet traveling in a second direction of the bi-directional connection; and
determine the same processor for the second packet from the set of multiple processors based, at least in part, on the second hash value;
wherein the first hash value and the second hash value are equal;
herein the first packet tuple and the second packet tuple are not equal.

12. The apparatus of claim 11,
wherein the circuitry to determine a first hash value comprises
   multiple hash circuits configured to operate on different orders of packet tuple data; and
   combinational circuitry fed the output of multiple asymmetric hash circuits.

13. The apparatus of claim 11,
wherein the first packet comprises an Internet Protocol datagram encapsulating a Transmission Control Protocol (TCP) segment; and
wherein the first packet tuple comprises the IP source address, the IP destination address, the TCP source port, and the TCP source port.

14. The apparatus of claim 11,
wherein the apparatus further comprises the set of multiple processors.

* * * * *